H. R. HIRST.
DEVICE FOR INSERTING PLUGS IN TIRES.
APPLICATION FILED DEC. 9, 1916.
1,223,878. Patented Apr. 24, 1917.
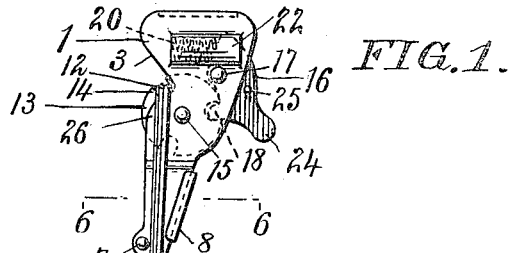
FIG. 1.
FIG. 2.
FIG. 3. FIG. 4. FIG. 5.
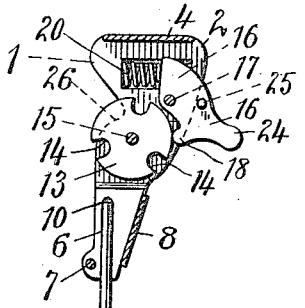 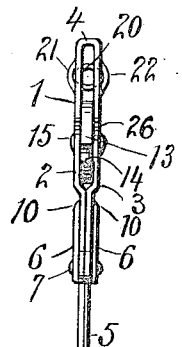 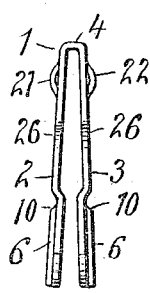
FIG. 6.
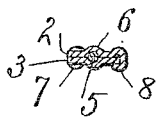
Inventor
Harry R. Hirst
By
F. DeWitt Goodwin
Attorney

UNITED STATES PATENT OFFICE.

HARRY R. HIRST, OF TRENTON, NEW JERSEY, ASSIGNOR OF ONE-HALF TO WILLIAM F. LEMON AND WALTER D. LEMON, TRADING AS WILLIAM F. LEMON & BRO., OF TRENTON, NEW JERSEY.

DEVICE FOR INSERTING PLUGS IN TIRES.

1,223,878.     Specification of Letters Patent.     Patented Apr. 24, 1917.

Application filed December 9, 1916. Serial No. 135,975.

*To all whom it may concern:*

Be it known that I, HARRY R. HIRST, a citizen of the United States, residing at Trenton, in the county of Mercer and State of New Jersey, have invented certain new and useful Improvements in Devices for Inserting Plugs in Tires, of which the following is a specification.

This invention relates to improvements in a device for inserting plugs into punctures in pneumatic tires. The object of my invention is to provide a device for quickly closing an aperture in a rubber tire by inserting a number of rubber bands forming a plug into the aperture.

This invention consists of a device over which the rubber bands are tightly stretched and having a needle carrying the rubber bands to be inserted into the tire, and also means for releasing the rubber bands from the device.

Referring to the accompanying drawing; Figure 1, is a side elevation of the device, showing the rubber bands stretched upon the same and inserted in a tire; Fig. 2, is a sectional view of a portion of a tire with the plug inserted and the inserting device removed; Fig. 3, is a central section through the device showing the parts in the position for releasing the rubber bands; Fig. 4, is an edge view of Fig. 3, looking from the left-hand side of the sheet; Fig. 5, is an edge view of the handle portion with the other parts removed, and Fig. 6, is a transverse section on line 6—6 Fig. 1.

In the drawings in which like references refer to like parts, 1, represents the handle portion of the device, made from a single piece of metal and bent over upon itself, as shown in Fig. 5, to form the sides 2 and 3 of the handle.

The end plate 4 serves as a suitable surface against which pressure may be exerted by the hand when the needle is being forced into a tire. The free ends of the plates 2 and 3 forming the handle 1 are bent inwardly, so that when they contact with each other, a space is formed between the remaining portions of the side plates for the movable parts of the device.

A needle 5 is securely held between the side plates 2 and 3 of the handle. The inner end of the needle 5 fits into semicircular depressions 6, formed in the side plates, which latter are securely held together by a rivet 7 and the turned edge 8, which is an extension upon one side plate and is clamped over the edge of the other side plate, as shown in Fig. 6. The shoulders 10 formed at the end of the recesses 6, prevent the needle 5 from being driven too far into the handle. The needle 5 is bifurcated at its free end to receive the rubber bands 12.

A wheel 13, having notches 14 formed therein, is rotatably mounted upon the shaft 15, secured between the side plates 2 and 3 of the handle. A pawl 16 is pivotally mounted upon a shaft 17 secured between the said side plates. The pawl 16 is provided with a projection 18, which is adapted to enter one of the notches 14 formed in the wheel 13 and prevents the wheel from turning. A spring 20 is mounted in the enlarged chamber formed by the outwardly pressed walls 21 and 22 of the side plates 2 and 3. The spring 20 acts upon the pawl 16 and tends to hold the projection 18 of the pawl in engagement with the notched wheel 13. The pawl 16 is provided with a finger grip 24 for operating the pawl to disengage the projection 18 from the notched wheel. A stop 25 is also provided upon the pawl 16 to limit the movement of the latter.

The operation of the invention is as follows:—The notched wheel is rotated until the projection upon the pawl enters one of the notches in the wheel and locks the latter. In this position of the wheel one of the notches is in the proper place to receive the rubber bands, as shown in Fig. 1. The rubber bands, are looped over the notched wheel and over the end of the needle. The needle is then forced through the aperture in the tire 30 and a portion of the rubber bands is carried through the aperture by the needle. The pawl is moved by pressing upon the finger grip 24, which releases the notched wheel. The latter revolves into the position shown in Fig. 3, due to the contraction of the rubber bands and the latter are released from the notched wheel, by the turning of the wheel. The edges of the side plates 2 and 3 have curved portions 26 adjacent to the wheel 13 which assist in forcing the rubber bands out of the notch 14 of the wheel when the latter revolves. When the rubber bands have been released from the notched wheel, the needle is withdrawn from the tire and the outer ends of the rubber bands are trimmed off, as shown in Fig. 2.

It will be seen that by this device any number of rubber bands may be inserted at one operation according to the size of the aperture in the tire. The rubber bands may be quickly applied to the device by placing the end loops of the bands over each fork of the needle and looping the middle portion of the band over the notched wheel or the end loops of the bands may be hooked over the notched wheel and the middle portion of the bands passed between the forks of the needle.

Having thus described my invention I claim and desire to secure by Letters Patent:—

1. In a device of the character described, the combination of a handle consisting of two side plates secured together, a needle secured between the side plates, a retaining member pivotally mounted between the side plates and means for locking the retaining member in a fixed position.

2. In a device of the character described the combination of a handle, a needle secured in the handle, engaging means formed upon the free end of the needle, a wheel having notches formed therein mounted in the handle and means for locking said wheel in a fixed position.

3. In a device of the character described, the combination of a handle having two side plates secured together, a needle secured in the side plates, a wheel having notches formed therein rotatably mounted between the side plates, a pawl adapted to lock the said wheel and means for disengaging the pawl from the wheel.

4. In a device of the character described, the combination of a handle formed from a single piece bent upon itself to form side plates, a needle secured between the adjacent end portions of the side plates, a fastening device for securing the side plates together, an engaging means formed upon the free end of the needle, a shoulder formed in the side plate to prevent any inward movement of the needle, a wheel having notches formed therein rotatably mounted between the side plates, a pawl loosely mounted between the side plates, a projection upon the pawl to engage the said wheel, a spring to hold the pawl in engagement with the wheel and a finger grip upon the pawl.

In testimony whereof I affix my signature in the presence of two witnesses.

HARRY R. HIRST.

Witnesses:
WM. F. LEMON,
ELLERY ROBBINS.

Copies of this patent may be obtained for five cents each, by addressing the "Commissioner of Patents, Washington, D. C."